United States Patent
Gupta et al.

(10) Patent No.: US 9,563,561 B2
(45) Date of Patent: Feb. 7, 2017

(54) INITIATION OF CACHE FLUSHES AND INVALIDATIONS ON GRAPHICS PROCESSORS

(71) Applicant: Intel Corporation, Santa Clara, CA (US)

(72) Inventors: Niraj Gupta, Bangalore (IN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 13/926,328

(22) Filed: Jun. 25, 2013

(65) Prior Publication Data

US 2014/0379993 A1  Dec. 25, 2014

(51) Int. Cl.
*G06F 12/08* (2016.01)

(52) U.S. Cl.
CPC ....... *G06F 12/0837* (2013.01); *G06F 12/0808* (2013.01); *G06F 2212/302* (2013.01)

(58) Field of Classification Search
None
See application file for complete search history.

(56) References Cited

U.S. PATENT DOCUMENTS

| 2002/0013892 | A1 | 1/2002 | Gorishek et al. |
| 2002/0016887 | A1 | 2/2002 | Scales |
| 2004/0098496 | A1 | 5/2004 | Wolrich et al. |
| 2009/0182954 | A1 | 7/2009 | Mejdrich et al. |
| 2010/0122259 | A1 | 5/2010 | Gosalia et al. |
| 2013/0298133 | A1* | 11/2013 | Jones et al. ............... 718/104 |
| 2014/0049549 | A1* | 2/2014 | Lukyanov et al. ....... 345/522 |

OTHER PUBLICATIONS

International Search Report and Written Opinion received for PCT Patent Application No. PCT/US2014/042870, mailed on Oct. 7, 2014, 12 pages.
International Preliminary Report on Patentability for PCT Application No. PCT/US2014/042870, mailed on Jan. 7, 2016, 8 pages.

* cited by examiner

*Primary Examiner* — Denise Tran
(74) *Attorney, Agent, or Firm* — Jordan IP Law, LLC

(57) ABSTRACT

Methods and systems may provide for receiving, at a graphics processor, a workload from a host processor and using a kernel on the graphics processor to issue a thread group for execution of the workload on the graphics processor. Additionally, one or more coherency messages may be initiated, by the graphics processor, in response to a thread-related condition of one or more caches on the graphics processor. In one example, the thread-related condition is associated with the execution of the workload on the graphics processor and indicates that the one or more caches on the graphics processor are not coherent with a system memory associated with the host processor.

24 Claims, 4 Drawing Sheets

INITIATION OF CACHE FLUSHES AND INVALIDATIONS ON GRAPHICS PROCESSORS

BACKGROUND

Certain applications such as games and media players may use embedded designs, graphics processing units (GPUs), etc., to handle compute intensive workloads. In such a case, a central processing unit (CPU) may dispatch the workloads to, for example, a GPU in the form of one or more commands, wherein the GPU may internally execute multiple threads in response to the commands. Each thread in a thread group will run in parallel, executing a kernel, as part of the workload running on the GPU. While such an approach may be suitable under certain circumstances, there remains considerable room for improvement. For example, a given GPU may have several caches containing data that becomes stale during execution of the workloads, wherein conventional computing solutions may rely on the CPU to flush and/or invalidate the caches of the GPU. Such an approach may result in suboptimal performance and an increased memory footprint (e.g., a relatively high number of memory allocations).

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
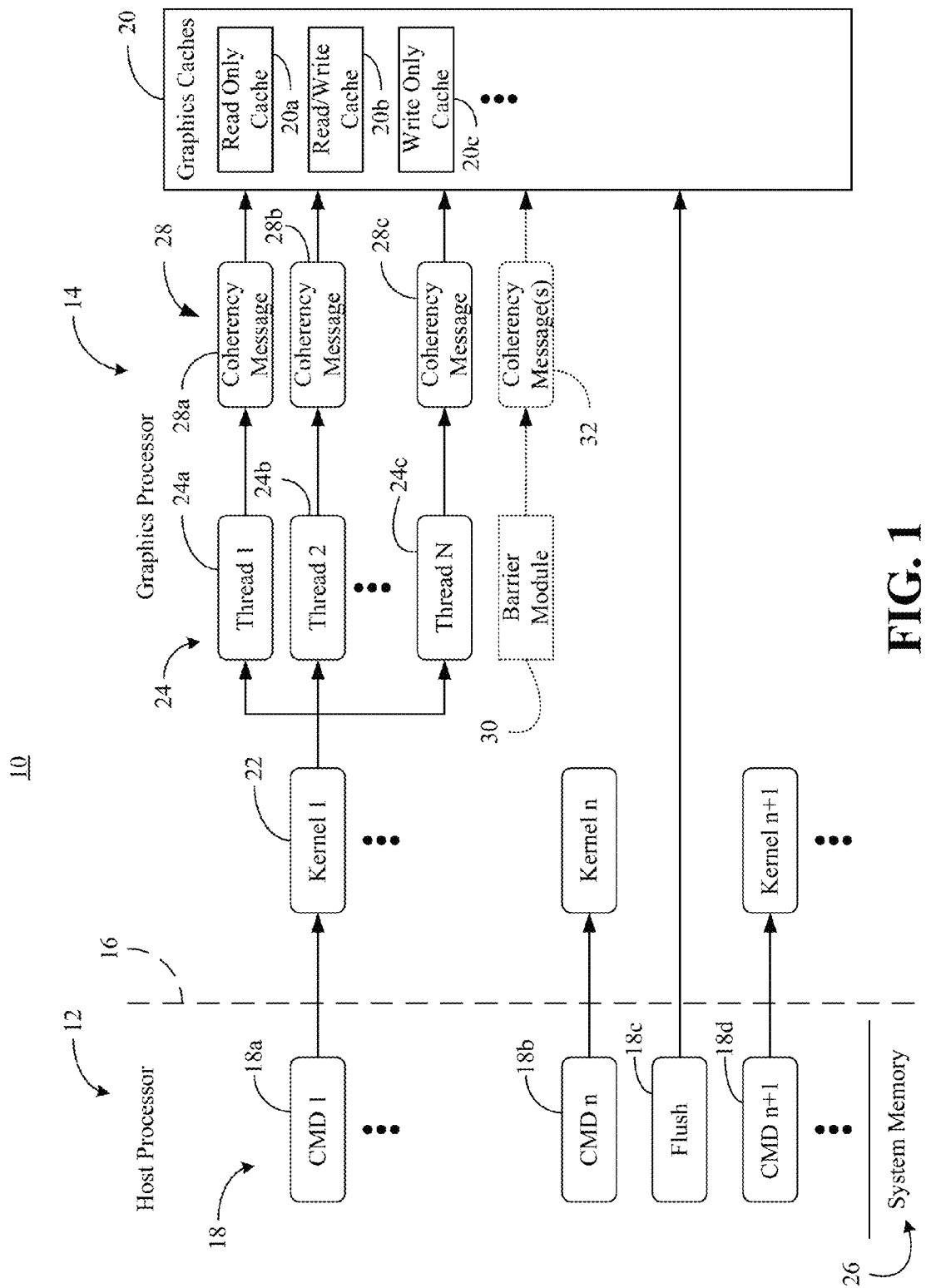
FIG. 1 is a block diagram of an example of a computing architecture according to an embodiment.

FIG. 1 shows a computing architecture 10 that may generally be part of a computing platform such as, for example, a smart phone, smart tablet, mobile Internet device (MID), smart television (TV), media player, notebook computer, desktop computer, server, etc. The illustrated architecture 10 includes a host processor 12 coupled to a graphics processor 14 via a bus 16. The bus 16 may be, for example, a PCI Express Graphics (PEG, e.g., Peripheral Components Interconnect/PCI Express x16 Graphics 150W-ATX Specification 1.0, PCI Special Interest Group) bus, Accelerated Graphics Port (e.g., AGP V3.0 Interface Specification, September 2002) bus, etc., that facilitates the transfer of information, commands and/or data between the host processor 12 and the graphics processor 14. In one example, the host processor 12 is a central processing unit (CPU) and the graphics processor 14 is a graphics processing unit (GPU) that may be used as a general purpose GPU (GPGPU).

The host processor 12 may issue a plurality of commands 18 (18a-18d) to the graphics processor 14 in conjunction with the processing of various workloads. In one example, the commands 18 are associated with compute intensive workloads such as image processing tasks encountered in graphics and/or media playing applications. Thus, a workload might be reflected in a first command 18a (CMD1), which causes a kernel 22 on the graphics processor 14 to issue a thread group 24 (24a-24c) for execution of the workload on the graphics processor 14. More particularly, one or more processing elements (e.g., cores, hardware threads, not shown) of the graphics processor 14 may concurrently execute the thread group 24 as software threads in order to achieve a relatively high amount of parallelism and processing efficiency with regard to the underlying workload.

The illustrated embedded processor or graphics processor 14 (or embedded processor) includes a plurality of graphics caches 20 (20a-20c) that are used by the software threads in the thread group 24 to store and/or transfer data during execution of the workload. The caches 20 may include, for example, a read only cache 20a (e.g., sampler cache), a read/write cache 20b (e.g., render cache), a write only cache 20c, and so forth. While three caches are illustrated, many more caches may be implemented on the graphics processor 14, depending upon the circumstances. Of particular note is that, due to execution of the software threads in the thread group 24, one or more of the caches 20 may contain data that is considered stale with respect to a system memory 26 associated with the host processor 12 (e.g., either the cache data is out-of-date or the system memory is out-of-date). The data in such "non-coherent" caches may be either flushed to the system memory 26 or flagged as invalid.

Rather than relying entirely on the host processor 12 to issue and/or initiate coherency commands such as a flush command 18c to address such a lack of coherency, the illustrated graphics processor 14 detects thread-related conditions of the caches 20, wherein the thread-related conditions may be associated with the execution of the workload on the graphics processor 14. For example, the operation of a first thread 24a on the caches 20 may change the validity of data from the perspective of a second thread 24b. In the illustrated example, the graphics processor 14 may initiate one or more coherency messages 28 (28a-28c) if the thread-related conditions indicate that one or more of the caches 20 are not coherent with the system memory 26. As will be discussed in greater detail, the coherency messages 28 may include flush messages that cause caches such as the read/write cache 20b and write only cache 20c to transfer their contents (e.g., flush) out to system memory 26, invalidate messages that cause the data stored in caches such as the read only cache 20a, read/write cache 20b and write only cache 20c to be deemed unreliable (e.g., invalid), and so forth.

In one example, hardware threads (e.g., cores, processing elements) of the graphics processor 14 the coherency messages 28 based on one or more instructions from the kernel 22. In such a case, the kernel 22 may dispatch instructions that contain the coherency messages 28 into the thread group 24, wherein each coherency message 28 may be issued to the graphics caches 20 once the relevant instruction have been executed by the corresponding hardware thread. For example, a first software thread 24a might include an instruction that contains a first coherency message 28a, a second software thread 24b may include an instruction that contains a second coherency message 28b, and so forth, wherein the coherency messages 28 may cause one or more of the caches 20 to flush and/or invalidate as appropriate. The illustrated approach may therefore enable cache coherency operations to be initiated at the kernel level, and may therefore enhance performance and reduce the memory footprint by decreasing the number of memory allocations needed. More specifically, a cache flush might be conducted prior to issuance of the flush command 18c by the host processor 12, in the illustrated example.

In another example, the thread group 24 may use barrier synchronization to ensure proper operation between software threads in the thread group 24. In such a case, the graphics processor 14 may optionally include a barrier module 30 to initiate one or more coherency messages 32 if each thread in the thread group 24 has encountered a barrier command (not shown). The barrier command may also be an instruction that is generated by the kernel 22 and incorporated into the software threads of the thread group 24. Once a processing element allocated to a particular software thread executes the barrier command, a barrier message (not shown) may be issued by that processing element to the barrier module 30. The barrier module 30 may in turn determine whether all software threads in the thread group 24 have encountered the barrier command. If so, the illustrated barrier module 30 issues the appropriate coherency messages 32 to flush and/or invalidate one or more of the graphics caches 20. Use of the barrier module 30 may enable cache coherency operations to be conducted at the sub-kernel level (e.g., mid-kernel), and may therefore further enhance performance and reduce the memory footprint.

More particularly, the barrier command followed by a flush may ensure that all threads in the thread group 24 have completed a part of a task necessary across all threads, and may ensure synchronization across all threads in the thread group 24 before issuing the coherency message 32. Such an approach may increase the effective use of the cache and avoid flushing or invalidating the cache while other threads in the thread group 24 are still using the data. As a result, the performance of the cache may increase. Once all threads have synchronized and completed using the data present in the cache, the coherency message may be issued.

The barrier commands from the kernel 22 and/or the barrier messages from the thread group 24 may contain state information that identifies which of the graphics caches 20 should be flushed and/or invalidated. Thus, the barrier module 30 may identify the caches to be flushed and/or invalidated based on the barrier messages from the thread group and direct the coherency messages 32 to only those caches involved/impacted.

Figure 2A:
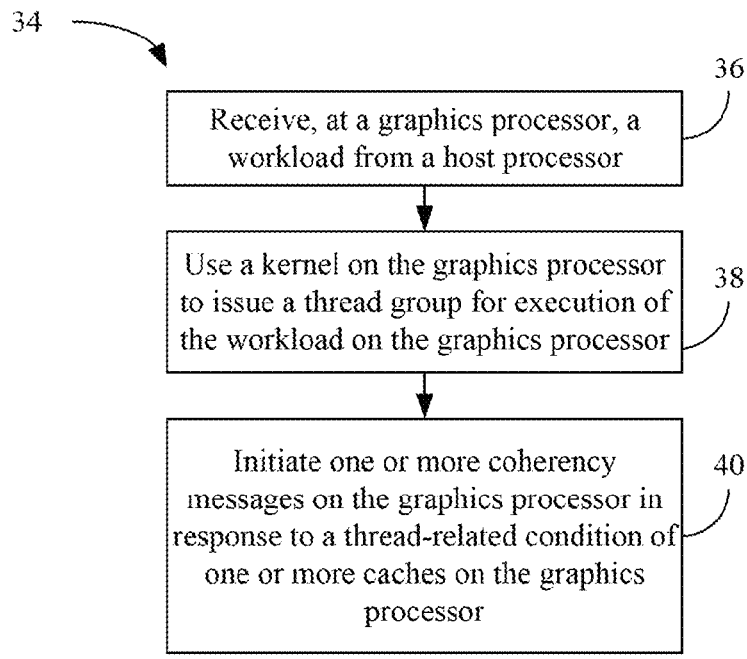
FIGS. 2A and 2B are flowcharts of examples of methods of maintaining cache coherency according to embodiments.

Turning now to FIG. 2A, a method 34 of maintaining cache coherency is shown. The method 34 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 34 may be written in any combination of one or more programming languages, including an object oriented programming language such as Java, Smalltalk, C++ or the like and conventional procedural programming languages, such as the "C" programming language or similar programming languages.

Illustrated processing block 36 provides for receiving, at a graphics processor, a workload from a host processor. A kernel on the graphics processor may be used at block 38 to issue a thread group for execution of the workload on the graphics processor, wherein block 40 may initiate, by the graphics processor, one or more coherency messages. In one example, the coherency messages are initiated in response to a thread-related condition of one or more caches on the graphics processor. Moreover, the thread-related condition may be associated with the execution of the workload on the graphics processor and indicate that the one or more caches on the graphics processor are not coherent with a system memory associated with the host processor. As already discussed, the coherency messages may include flush messages, invalidate messages, and so forth.

Figure 2B:
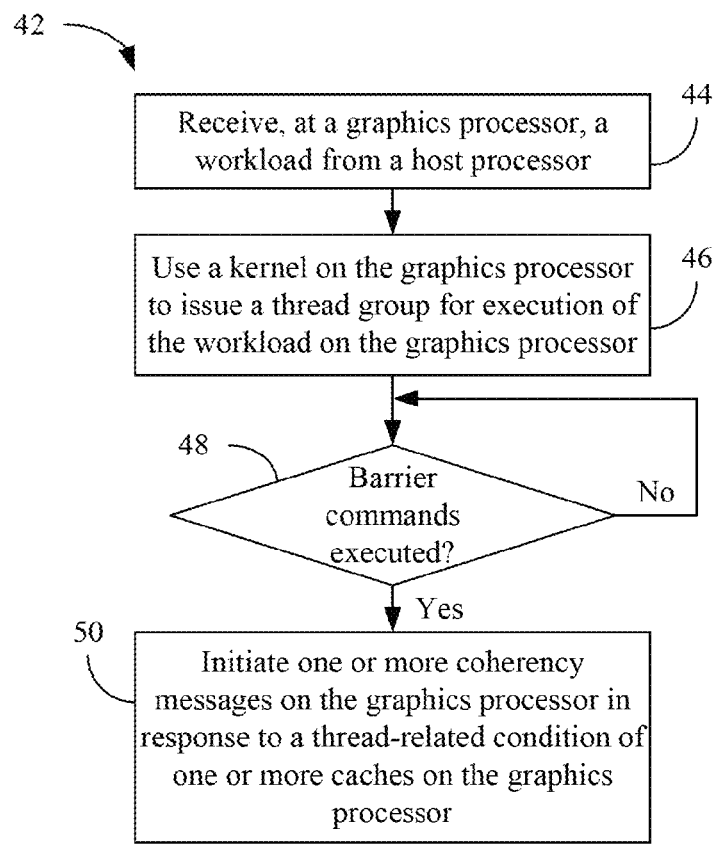

FIG. 2B shows another method 42 of maintaining cache coherency in which barrier synchronization is implemented. The method 42 may be implemented in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 36 provides for receiving, at a graphics processor, a workload from a host processor, wherein a kernel on the graphics processor may be used at block 46 to issue a thread group for execution of the workload on the graphics processor.

A determination may be made at block 48 as to whether each software thread in the thread group has encountered a barrier command. The determination at block 48 may involve determining whether the all processing elements executing the software threads in the thread group have issued barrier message. If so, illustrated block 50 initiates one or more coherency messages on the graphics processor in response to a thread-related condition of one or more caches on the graphics processor. Initiating the coherency messages may involve identifying the one or more caches based on one or more barrier messages from the thread group and directing the coherency messages to the identified caches.

Figure 3:
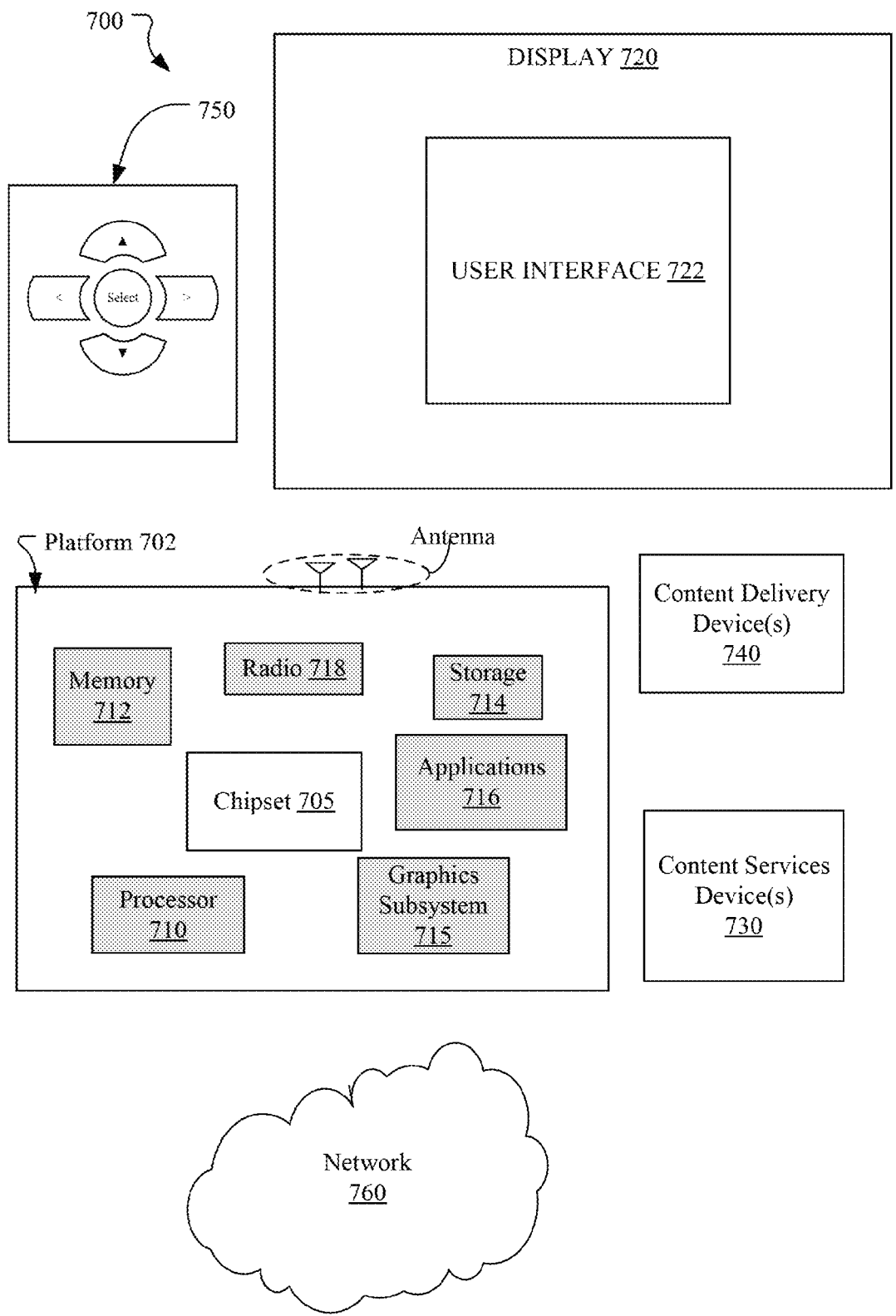
FIG. 3 is a block diagram of an example of a system having a navigation controller according to an embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to maintain cache coherency for video bitstreams as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the graphics processor 14 (FIG. 1), already discussed. In addition, the processor 710 may be configured to operate as the host processor 12 (FIG. 1), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
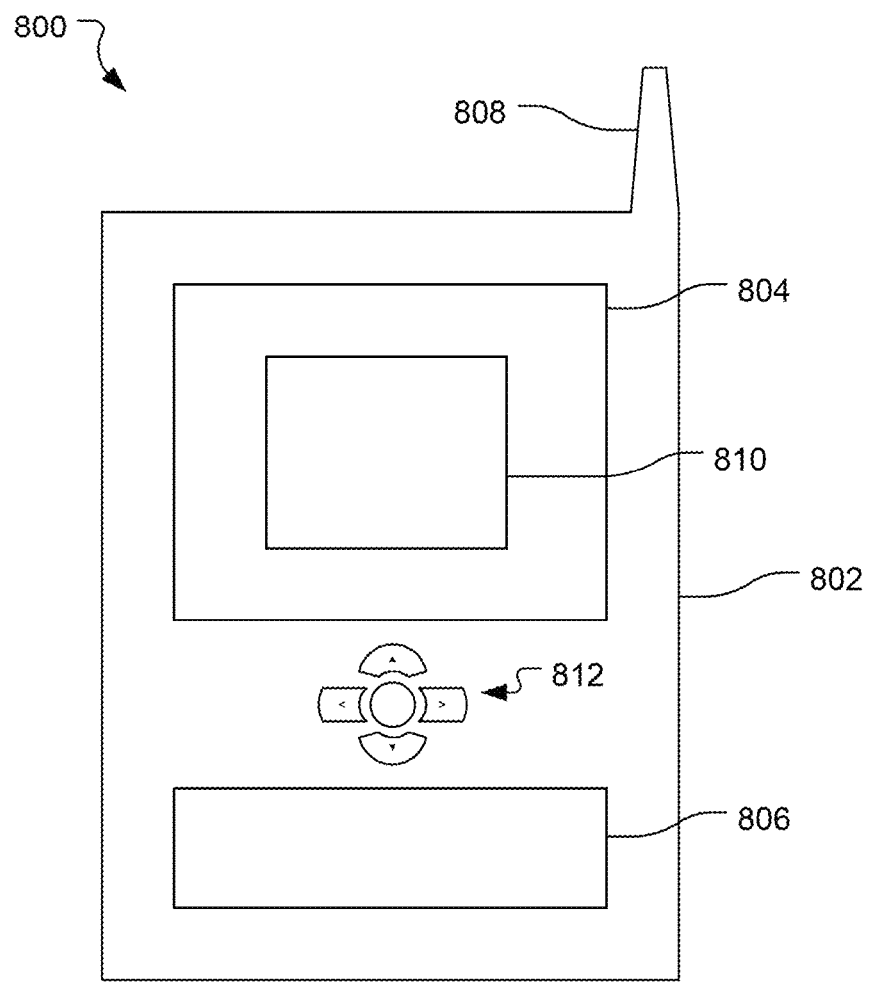
FIG. 4 is a block diagram of an example of a system having a small form factor according to an embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Thus, techniques described herein may flush and/or invalidate the caches of graphics processors and other embedded devices at the kernel or sub-kernel level. Such an approach may result in optimal performance and a decreased memory footprint (e.g., relatively low number of memory allocations).

Additional Notes and Examples

Example 1 may include a system to maintain cache coherency, having a host processor, a system memory associated with the host processor, a bus coupled to the host processor and a graphics processor coupled to the bus. The graphics processor may receive a workload from the host processor and include a plurality of caches. The graphics processor may also include a kernel to issue a thread group for execution of the workload on the graphics processor. The graphics processor may initiate one or more coherency messages in response to a thread-related condition of one or more of the plurality of caches.

Example 2 may include the system of example 1, wherein the thread-related condition is to be associated with the execution of the workload on the graphics processor and indicate that the one or more of the plurality of caches are not coherent with the system memory.

Example 3 may include the system of example 1, wherein the one or more coherency messages are to include one or more of a flush message and an invalidate message.

Example 4 may include the system of any one of examples 1 to 3, wherein the thread group is to generate the one or more coherency messages based on one or more instructions from the kernel.

Example 5 may include the system of any one of examples 1 to 3, wherein the graphics processor further includes a barrier module to initiate the one or more coherency messages if each thread in the thread group has encountered a barrier command.

Example 6 may include the system of example 5, wherein the barrier module is to identify the one or more of the plurality of caches based on one or more barrier messages from the thread group and direct the one or more coherency messages to the one or more of the plurality of caches.

Example 7 may include an apparatus to maintain cache coherency, having a graphics processor to receive a workload from a host processor. The graphics processor may include a plurality of caches and a kernel to issue a thread group for execution of the workload on the graphics processor. The graphics processor may also initiate one or more coherency messages in response to a thread-related condition of one or more of the plurality of caches.

Example 8 may include the apparatus of example 7, wherein the thread-related condition is to be associated with the execution of the workload on the graphics processor and indicate that the one or more of the plurality of caches are not coherent with a system memory associated with the host processor.

Example 9 may include the apparatus of example 7, wherein the one or more coherency messages are to include one or more of a flush message and an invalidate message.

Example 10 may include the apparatus of any one of examples 7 to 9, wherein the thread group is to generate the one or more coherency messages based on one or more instructions from the kernel.

Example 11 may include the apparatus of any one of examples 7 to 9, wherein the graphics processor further includes a barrier module to initiate the one or more coherency messages if each thread in the thread group has encountered a barrier command.

Example 12 may include the apparatus of example 11, wherein the barrier module is to identify the one or more of the plurality of caches based on one or more barrier messages from the thread group and direct the one or more coherency messages to the one or more of the plurality of caches.

Example 13 may include a method of maintaining cache coherency that involves receiving, at a graphics processor, a workload from a host processor, and invoking a multiple thread group, where each thread group executes a kernel as part of execution of the workload on the graphics processor. The method may also provide for initiating, by the graphics processor, one or more coherency messages in response to a thread-related condition of one or more caches on the graphics processor.

Example 14 may include the method of example 13, wherein the thread-related condition is associated with the execution of the workload on the graphics processor and indicates that the one or more caches on the graphics processor are not coherent with a system memory associated with the host processor.

Example 15 may include the method of example 13, wherein the one or more coherency messages include one or more of a flush message and an invalidate message.

Example 16 may include the method of any one of examples 13 to 15, further including generating the one or more coherency messages based on one or more instructions from the kernel.

Example 17 may include the method of any one of examples 13 to 15, wherein the one or more coherency messages are initiated if each thread in the thread group has encountered a barrier command.

Example 18 may include the method of example 17, further including identifying the one or more caches based on one or more barrier messages from the thread group, and directing the one or more coherency messages to the one or more caches.

Example 19 may include at least one computer readable storage medium having an application or workload which, if executed on a host processor, issues commands to a graphics processing unit. The application, if executed, may also cause commands to be dispatched to the graphics processor which may issue multiple thread groups executing a kernel on the graphics processor. The graphics processor may initiate one or more coherency messages in response to a thread-related condition of one or more caches on the graphics processor.

Example 20 may include the at least one computer readable storage medium of example 19, wherein the thread-related condition is to be associated with the execution of the workload on the graphics processor and indicate that the one or more caches on the graphics processor are not coherent with a system memory associated with the host processor.

Example 21 may include the at least one computer readable storage medium of example 19, wherein the one or more coherency messages are to include one or more of a flush message and an invalidate message.

Example 22 may include the at least one computer readable storage medium of any one of examples 19 to 21, wherein the instructions, if executed, cause a computer to generate the one or more coherency messages based on one or more instructions from the kernel.

Example 23 may include the at least one computer readable storage medium of any one of examples 19 to 21, wherein the one or more coherency messages are to be initiated if each thread in the thread group has encountered a barrier command.

Example 24 may include the at least one computer readable storage medium of example 23, wherein the instructions, if executed, cause a computer to identify the one or more caches based on one or more barrier messages from the thread group, and direct the one or more coherency messages to the one or more caches.

Example 24 may include an apparatus comprising means for performing any one of the methods of examples 13 to 18.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. A system comprising:
    a host processor;
    a system memory associated with the host processor;
    a bus coupled to the host processor; and
    a graphics processor coupled to the bus, the graphics processor to receive a workload from the host processor and including,
        a plurality of caches, and
        a kernel to issue a thread group for execution of the workload on the graphics processor in response to the graphics processor detecting a thread-related condition of one or more of the plurality of caches, wherein the graphics processor is to initiate one or more coherency messages in response to the thread-related condition of one or more of the plurality of caches, and the thread-related condition is to be associated with the execution of the workload on the graphics processor, wherein the thread group contains a plurality of threads and each of the plurality of threads includes a corresponding coherency message, and
    wherein the graphics processor is to enable cache coherency operations to be initiated at a kernel or sub-kernel level.

2. The system of claim 1, wherein the thread-related condition indicates that the one or more of the plurality of caches are not coherent with the system memory.

3. The system of claim 1, wherein the one or more coherency messages are to include one or more of a flush message and an invalidate message.

4. The system of claim 1, wherein the thread group is to generate the one or more coherency messages based on one or more instructions from the kernel.

5. The system of claim 1, wherein the graphics processor further includes a barrier module to initiate the one or more coherency messages when each thread in the thread group has encountered a barrier command.

6. The system of claim 5, wherein the barrier module is to identify the one or more of the plurality of caches based on one or more barrier messages from the thread group and direct the one or more coherency messages to the one or more of the plurality of caches.

7. An apparatus comprising:
a graphics processor to receive a workload from a host processor, the graphics processor including,
a plurality of caches, and
a kernel to issue a thread group for execution of the workload on the graphics processor in response to the graphics processor detecting a thread-related condition of one or more of the plurality of caches, wherein the graphics processor is to initiate one or more coherency messages in response to the thread-related condition of one or more of the plurality of caches, and the thread-related condition is to be associated with the execution of the workload on the graphics processor, wherein the thread group contains a plurality of threads and each of the plurality of threads includes a corresponding coherency message, and
wherein the graphics processor is to enable cache coherency operations to be initiated at a kernel or sub-kernel level.

8. The apparatus of claim 7, wherein the thread-related condition indicates that the one or more of the plurality of caches are not coherent with a system memory associated with the host processor.

9. The apparatus of claim 7, wherein the one or more coherency messages are to include one or more of a flush message and an invalidate message.

10. The apparatus of claim 7, wherein the thread group is to generate the one or more coherency messages based on one or more instructions from the kernel.

11. The apparatus of claim 7, wherein the graphics processor further includes a barrier module to initiate the one or more coherency messages when each thread in the thread group has encountered a barrier command.

12. The apparatus of claim 11, wherein the barrier module is to identify the one or more of the plurality of caches based on one or more barrier messages from the thread group and direct the one or more coherency messages to the one or more of the plurality of caches.

13. A method comprising:
receiving, at a graphics processor, a workload from a host processor;
using, in response to the graphics processor detecting a thread-related condition of one or more of the plurality of caches, a kernel on the graphics processor to issue a thread group for execution of the workload on the graphics processor, wherein the thread-related condition is associated with the execution of the workload on the graphics processor; and
initiating, by the graphics processor, one or more coherency messages in response to a thread-related condition of one or more caches on the graphics processor, wherein the thread group contains a plurality of threads and each of the plurality of threads includes a corresponding coherency message, and wherein the coherency operations are initiated at a kernel or sub-kernel level.

14. The method of claim 13, wherein the thread-related condition indicates that the one or more caches on the graphics processor are not coherent with a system memory associated with the host processor.

15. The method of claim 13, wherein the one or more coherency messages include one or more of a flush message and an invalidate message.

16. The method of claim 13, further including generating the one or more coherency messages based on one or more instructions from the kernel.

17. The method of claim 13, wherein the one or more coherency messages are initiated when each thread in the thread group has encountered a barrier command.

18. The method of claim 17, further including:
identifying the one or more caches based on one or more barrier messages from the thread group; and
directing the one or more coherency messages to the one or more caches.

19. At least one non-transitory computer readable storage medium comprising a set of instructions which, when executed by a graphics processor, cause a computer to:
receive, at the graphics processor, a workload from a host processor;
use, in response to the graphics processor detecting a thread-related condition of one or more of the plurality of caches, a kernel on the graphics processor to issue a thread group for execution of the workload on the graphics processor, wherein the thread-related condition is to be associated with the execution of the workload on the graphics processor; and
initiate, by the graphics processor, one or more coherency messages in response to a thread-related condition of one or more caches on the graphics processor, wherein the thread group contains a plurality of threads and each of the plurality of threads includes a corresponding coherency message, and wherein the coherency operations are to be initiated at a kernel or sub-kernel level.

20. The at least one non-transitory computer readable storage medium of claim 19, wherein the thread-related condition indicates that the one or more caches on the graphics processor are not coherent with a system memory associated with the host processor.

21. The at least one non-transitory computer readable storage medium of claim 19, wherein the one or more coherency messages are to include one or more of a flush message and an invalidate message.

22. The at least one non-transitory computer readable storage medium of claim 19, wherein the instructions, if executed, cause a computer to generate the one or more coherency messages based on one or more instructions from the kernel.

23. The at least one non-transitory computer readable storage medium of claim 19, wherein the one or more coherency messages are to be initiated when each thread in the thread group has encountered a barrier command.

24. The at least one non-transitory computer readable storage medium of claim 23, wherein the instructions, if executed, cause a computer to:

identify the one or more caches based on one or more barrier messages from the thread group; and direct the one or more coherency messages to the one or more caches.

* * * * *